Patented Aug. 4, 1936

2,049,591

UNITED STATES PATENT OFFICE 2,049,591

PROCESS FOR THE PRESERVATION OF MILK AND OTHER OR SIMILAR FOOD PRODUCTS

William Rafn, Oslo, Norway, assignor to Aktiengesellschaft fur Patent und Industriewerte, Glaris, Switzerland, a company of Switzerland No Drawing. Application August 24, 1933, Serial No. 686,571. In Great Britain August 25, 1932

8 Claims. (Cl. 99—184)

This invention relates to a process for the preservation of milk and other or similar food products which comprises the sterilization thereof at high temperature for very short duration of time whereby a complete control of the time and temperature degree is secured with an instantaneous cooling effect in combination with a subsequent sterilization after the milk or other food product has been filled into the container.

In order to impart a keeping quality to milk, in fresh condition or in condensed form and devoid of added matter, such as sugar, it is customary to subject the same to a sterilizing or heat treatment; the usual procedure consisting in pre-heating the milk at various temperatures up to about 100° C., then, in the case of a condensed product being required, to subject it to a condensing and homogenizing treatment. Finally, the milk so treated is conducted or filled into containers in which it is subjected to further heating for about one quarter of an hour at a temperature of about 112° to 116° C. which treatment it is found has the effect of producing extensive chemical and physical changes in the milk inasmuch that the milk sugar becomes caramelized and so affects the colour and taste of the product, at the same time destroying or coagulating the proteins and rendering the product of a thick consistency. These reactions moreover result in giving what is known as a "cooked" flavour which is particularly noticeable and objectionable in the case of diluted evaporated milk and is very marked when the milk is used in coffee or other food stuff. A metallic taste is also noticeable resulting as it does from oxidation owing to the use of metal containers.

According to this invention, whereby the above mentioned inconveniences and objections are overcome or minimized, the milk or the like is subjected to the heating or sterilizing effect of a temperature above 120° C. for a period of time not exceeding one minute in a closed heating chamber through a continuous process and thereupon cooled instantaneously; the milk or the like being then charged or filled into sterilized containers. These filled containers are then subjected to further heat treatment of which the temperature degree and the duration are considerably lower and shorter than those heretofore ordinarily known or adopted.

Before the charging of the milk into the sterilized containers it may be subjected to some further treatment such as condensation or homogenization.

In carrying the process of preservation according to the present invention into effect, the following is given as an example:

Milk or the like supplied in a continuous flow or stream is sterilized by raising its temperature to 122° C. for the duration of forty-five seconds and then cooled instantaneously. If, in this heat treatment the milk is caused to flow in a thin film, as will be readily understood, an enhanced sterilizing effect will be obtained and the temperature degree and duration of the treatment exactly determinable.

The resulting heated or sterilized and cooled milk, with or without further treatment such as condensation or/and homogenization, is charged or filled into containers which have been previously sterilized and the filled containers subjected to a slight heating treatment, such as a temperature of 107° C. for a period of eight minutes which is found to prevent reinfection as the result of the filling operation or the further treatment above referred to.

For preventing fat separation during storage, the milk or the like is homogenized either before or after being sterilized. If the latter course be adopted, homogenization should be effected under conditions as nearly sterile as possible. Similarly, if the milk is subjected to the condensation process.

By means of the invention, which comprises a double treatment by heat, filling the containers is rendered capable of accomplishment under conditions which are not in themselves of an absolutely sterile character.

What I claim and desire to secure by Letters Patent of the United States is:—

1. A process for the preservation of milk and the like comprising sterilizing the milk by heating to a sterilizing temperature of approximately 122° C. for a period not exceeding one minute, cooling the milk substantially instantaneously, filling sterilized containers with the milk so treated, hermetically sealing the filled containers, and heating the sealed containers to a temperature between 100 and 107° C. for a period of approximately eight minutes.

2. A process for the preservation of milk and the like which comprises subjecting the milk to a homogenizing treatment, subjecting the homogenized milk to a sterilizing temperature of approximately 122° C. for a period not exceeding one minute, cooling the milk substantially instantaneously, filling sterilized containers with the milk, hermetically sealing the filled containers, and heating the filled and sealed containers to a temperature between 100 and 107°

C. for a period of approximately eight minutes.

3. A process for the preservation of milk and the like which comprises conducting the milk to a closed chamber in a thin continuous film and subjecting the milk to a sterilizing temperature of approximately 122° C. for a period not exceeding one minute, thereupon instantaneously cooling the milk, filling sterilized containers with the milk and hermetically sealing the filled containers, and heating the sealed containers to a temperature between 100 and 107° C. for a period of approximately eight minutes.

4. A process for the preservation of milk and similar liqueform and perishable foods packed into hermetically sealed tins which comprises subjecting the milk to a homogenizing treatment, then conducting the homogenized milk to a closed chamber and in a continuous thin film subjecting the said milk to a sterilizing temperature of approximately 122° C. for a time period not exceeding one minute, thereupon instantaneously cooling the homogenized and sterilized milk, then filling the homogenized, sterilized and cooled milk into tins, sealing the filled tins and then subjecting the milk so tinned and sealed to a further heat treatment reaching a temperature between 100 and 107° C. for a period of approximately eight minutes.

5. A process for the preservation of milk and similar liqueform and perishable foods packed into hermetically sealed tins which comprises homogenizing the milk, then subjecting the homogenized milk in a closed chamber in continuous flow and thin film to a sterilizing temperature of approximately 122° C. for a time period not exceeding one minute, thereupon instantaneously cooling the homogenized and sterilized milk, then subjecting the milk to a further homogenizing treatment, then filling the doubly homogenized, sterilized and cooled milk into tins, sealing the said filled tins and then subjecting the milk so filled and sealed to a further heat treatment reaching a temperature between 100 and 107° C. for a period of approximately eight minutes.

6. A process for the preservation of milk and similar liqueform and perishable foods packed into hermetically sealed tins which comprises subjecting fresh milk to a condensing treatment, then subjecting the condensed milk in a closed chamber in a continuous flow and thin film to a sterilizing temperature of approximately 122° C. for a time period not exceeding one minute, thereupon instantaneously cooling the condensed and sterilized milk, then filling the condensed, sterilized and cooled milk into tins, sealing the said filled tins and then subjecting the milk so tinned and sealed to a further heat treatment reaching a temperature between 100 and 107° C. for a period of approximately eight minutes.

7. A process for the preservation of milk and similar liqueform and perishable foods packed into hermetically sealed tins which comprises subjecting fresh milk to a condensing and homogenizing treatment, then subjecting the condensed and homogenized milk while flowing in a continuous film in a closed chamber to a sterilizing temperature of approximately 122° C. for a time period not exceeding one minute, thereupon instantaneously cooling the milk, then filling the milk into tins, sealing the filled tins and then subjecting the filled and sealed condensed, homogenized and sterilized milk to a further heat treatment reaching a temperature between 100 and 107° C. for a period of approximately eight minutes.

8. A process for the preservation of milk and similar liqueform and perishable foods packed into hermetically sealed tins which comprises condensing the milk, then subjecting the condensed milk in a closed chamber in continuous flow and thin film to a sterilizing temperature of approximately 122° C. for a time period not exceeding one minute, thereupon instantaneously cooling the milk, then subjecting the milk to a homogenizing treatment, then filling the condensed, sterilized, cooled and homogenized milk into tins, sealing the filled tins and then subjecting the milk so tinned and sealed to a further heat treatment reaching a temperature between 100 and 107° C. for a period of approximately eight minutes.

WILLIAM RAFN.